C. W. & G. W. GARLAND.
THROTTLE VALVE LEVER.
No. 175,964. Patented April 11, 1876.
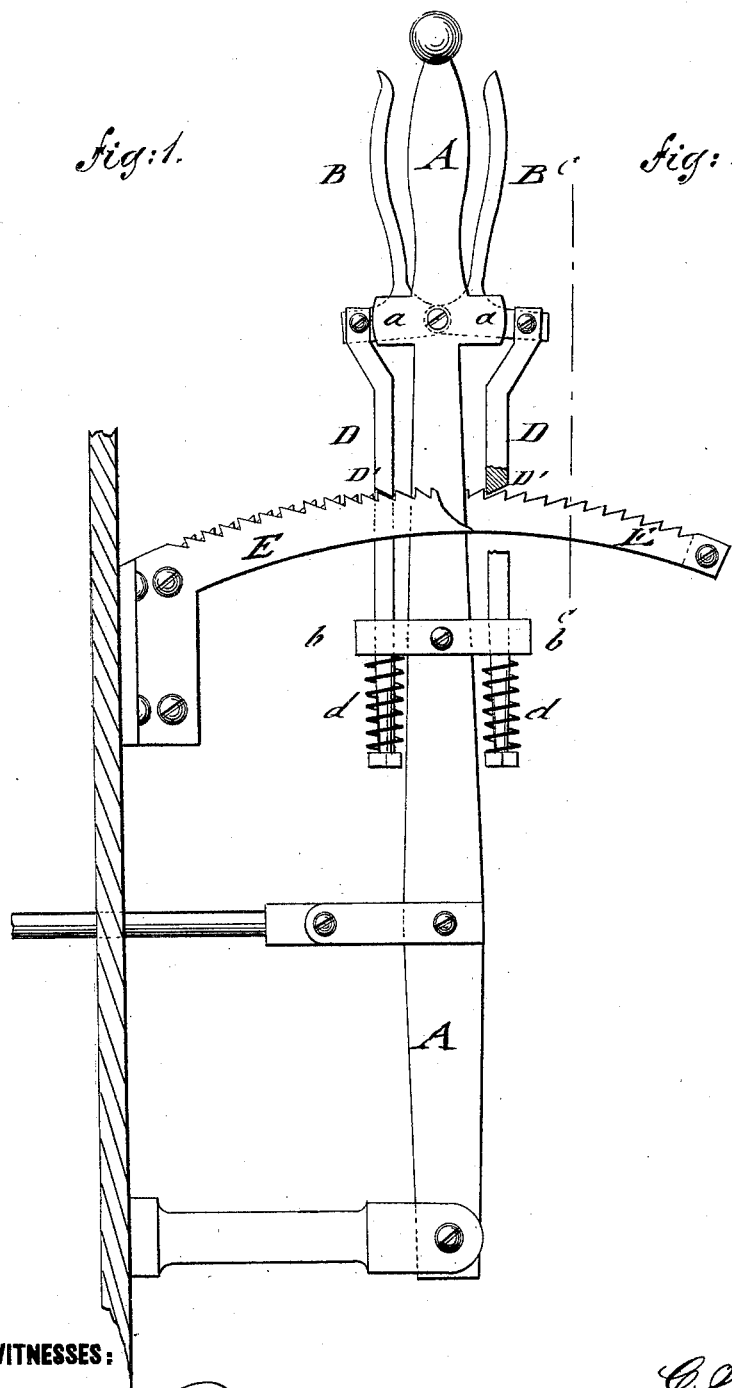
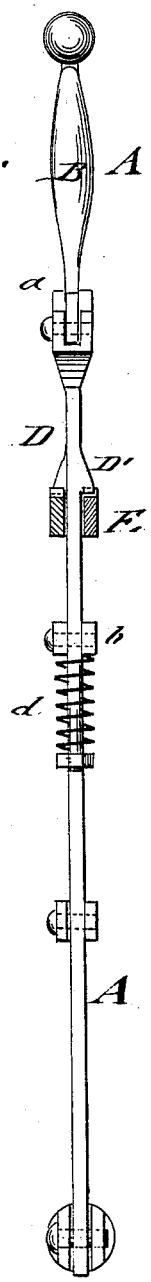

UNITED STATES PATENT OFFICE.

CHARLES W. GARLAND AND GEORGE W. GARLAND, OF LANCASTER, N. H.

IMPROVEMENT IN THROTTLE-VALVE LEVERS.

Specification forming part of Letters Patent No. 175,964, dated April 11, 1876; application filed March 25, 1876.

*To all whom it may concern:*

Be it known that we, CHARLES W. GARLAND and GEORGE W. GARLAND, of Lancaster, in the county of Coos and State of New Hampshire, have invented a new and Improved Throttle-Valve Lever for Locomotives, of which the following is a specification:

In the accompanying drawing, Figure 1 represents a side elevation, and Fig. 2 a vertical transverse section on line $c\,c$, Fig. 1, of our improved throttle-valve lever for locomotives.

Similar letters of reference indicate corresponding parts.

The object of our invention is to provide for locomotives an improved throttle-valve lever that is instantly released by taking hold of the handles, but rigidly locked against action on any other part of the lever, so that the throttle-valve is speedily operated in case of danger, but not disturbed by accidental contact with the lever. The invention consists of a swinging throttle-valve lever, with supplementary-fulcrumed handles, that release spring-dogs from double arc-shaped ratchet-bars, but lock the lever securely when not taken hold of.

In the drawing, A represents the throttle-valve lever, that is pivoted in the usual manner at the lower end to a supporting-arm and connected at some distance above the same by a forked pivot-link to the piston-rod of the throttle-valve. The handle end of lever A is provided with recessed side lugs $a$, to which supplementary handles B, of bell-crank shape, are pivoted. To the shorter lever-arms of the bell-crank-shaped handles B are pivoted the spring-acted bars D, which pass downward along the sides of the lever and slide in cross-guides $b$ of the same, being acted upon by spiral springs $d$, that are interposed between the cross-guides and the end collars or nuts of the dog-bars. The lever A and dog-bars D swing in arc-shaped ratchet-bars E, whose teeth are arranged in opposite direction to each other and engaged by the projecting dogs $D'$ of the bars D, so as to lock the bars rigidly against being pushed in either direction. When the supplementary handles are taken hold of and pressed against the thinner handle of the lever, the spring-acted dog-bars are pulled up so that the dogs clear the ratchet and admit the swinging of the lever in either direction, the dogs being instantly carried back into the ratchet-teeth on the release of the handles. The lever is thereby positively locked when not taken hold of at the handles, and the old unreliable thumb-nut for fastening the lever dispensed with. The valve-piston also requires less packing than with the ordinary lever, and admits, therefore, its easier operation.

Having thus described our invention, what we claim as new, and desire to secure by Letters Patent, is—

The combination of a throttle-valve lever, having supplementary handles fulcrumed thereto and sliding and spring-acted dog-bars operated thereby, with guiding arc-shaped ratchet-bars, having teeth placed in opposite direction to each other, substantially as and for the purpose set forth.

CHARLES W. GARLAND.
GEORGE W. GARLAND.

Witnesses:
JAMES C. MITCHELL,
CHAS. E. ALLEN.